(12) United States Patent
Schoo et al.

(10) Patent No.: US 8,536,244 B2
(45) Date of Patent: Sep. 17, 2013

(54) FRICTION LINING MIXTURE FOR A FRICTION MATERIAL, IN PARTICULAR FOR BRAKE AND CLUTCH LININGS

(75) Inventors: Norbert Schoo, Reinbek (DE); Stephan Ernesti, Hamburg (DE); Andreas Goldschmidt, Hamburg (DE); Thomas Pfannebecker, Hamburg (DE); Gerhard Burmester, Hamburg (DE)

(73) Assignee: Honeywell Bremsbelag GmbH, Glinde (DE)

( * ) Notice: Subject to any disclaimer, the term of this patent is extended or adjusted under 35 U.S.C. 154(b) by 305 days.

(21) Appl. No.: 12/825,872

(22) Filed: Jun. 29, 2010

(65) Prior Publication Data

US 2010/0331447 A1    Dec. 30, 2010

(30) Foreign Application Priority Data

Jun. 30, 2009 (DE) .................... 20 2009 008 963 U
Mar. 4, 2010 (DE) .................... 20 2010 003 143 U

(51) Int. Cl.
*C08J 5/14* (2006.01)
(52) U.S. Cl.
USPC ............ 523/157; 523/149; 523/152; 523/200
(58) Field of Classification Search
USPC .................................. 523/149, 152, 157, 200
See application file for complete search history.

(56) References Cited

U.S. PATENT DOCUMENTS

| | | | |
|---|---|---|---|
| 4,373,037 A | 2/1983 | Washabaugh | |
| 6,303,545 B1 | 10/2001 | Huener et al. | |
| 2002/0137815 A1* | 9/2002 | Takeuchi et al. | ............ 523/152 |
| 2006/0151268 A1* | 7/2006 | Kesavan et al. | ........... 188/251 A |
| 2009/0064896 A1 | 3/2009 | Pearce et al. | |

FOREIGN PATENT DOCUMENTS

| | | |
|---|---|---|
| DE | 1 150 918 | 6/1963 |
| DE | 1153 670 | 8/1963 |
| EP | 0 093 673 B1 | 11/1983 |
| EP | 0184708 A2 | 6/1986 |
| EP | 0 654 616 B1 | 5/1995 |
| EP | 0699728 A1 | 3/1996 |
| EP | 1 681 489 A1 | 7/2006 |
| EP | 1 482 204 B1 | 8/2006 |
| WO | 01/34330 A1 | 5/2001 |
| WO | WO 2005057042 A2 * | 6/2005 |
| WO | 2010/016079 A1 | 2/2010 |

OTHER PUBLICATIONS

Machine translation of WO 2005/057042 A2, Jun. 23, 2005.*

* cited by examiner

*Primary Examiner* — Vickey Nerangis
(74) *Attorney, Agent, or Firm* — Alston & Bird LLP

(57) ABSTRACT

The friction lining mixture for a friction material for brake and clutch linings, the brake and clutch linings contains metal fibers and/or powder, functional fillers, lubricants and organic compounds for improving the performance capability of the friction pairing metallic and/or alloyed and/or bound tin in an amount of 0.5 to 50.0 percent by weight, preferably 2.0 to 10.0 percent by weight, the copper content in the friction lining mixture being 0.001 to 4.999 percent by weight, preferably 0.001 to 0.499 percent by weight.

14 Claims, 7 Drawing Sheets

Figure 1:
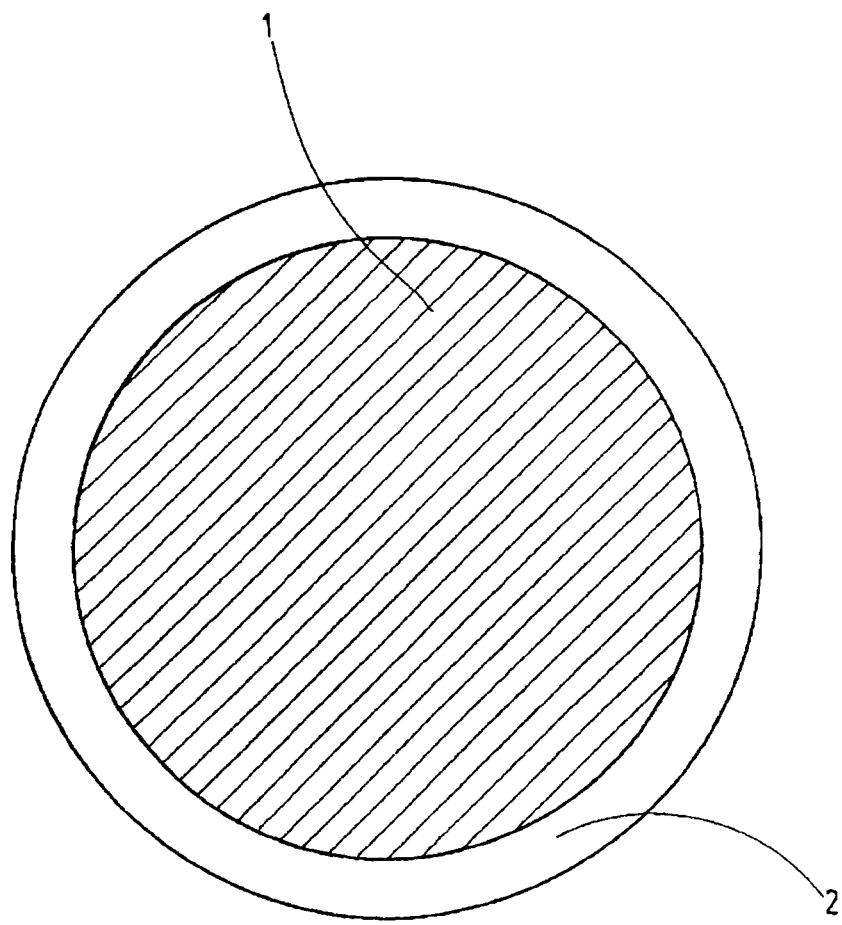
Figure 2:
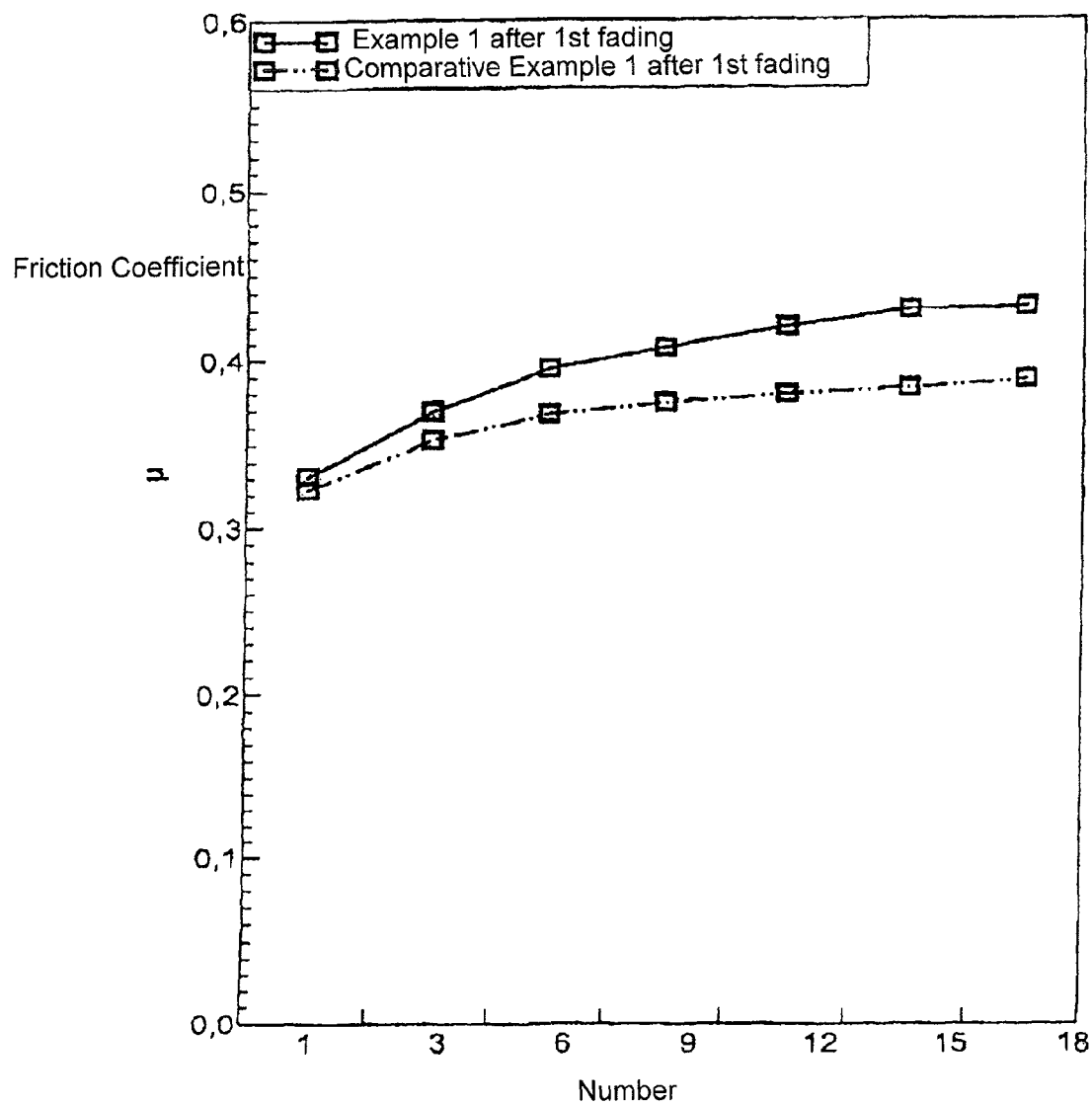
Figure 3:
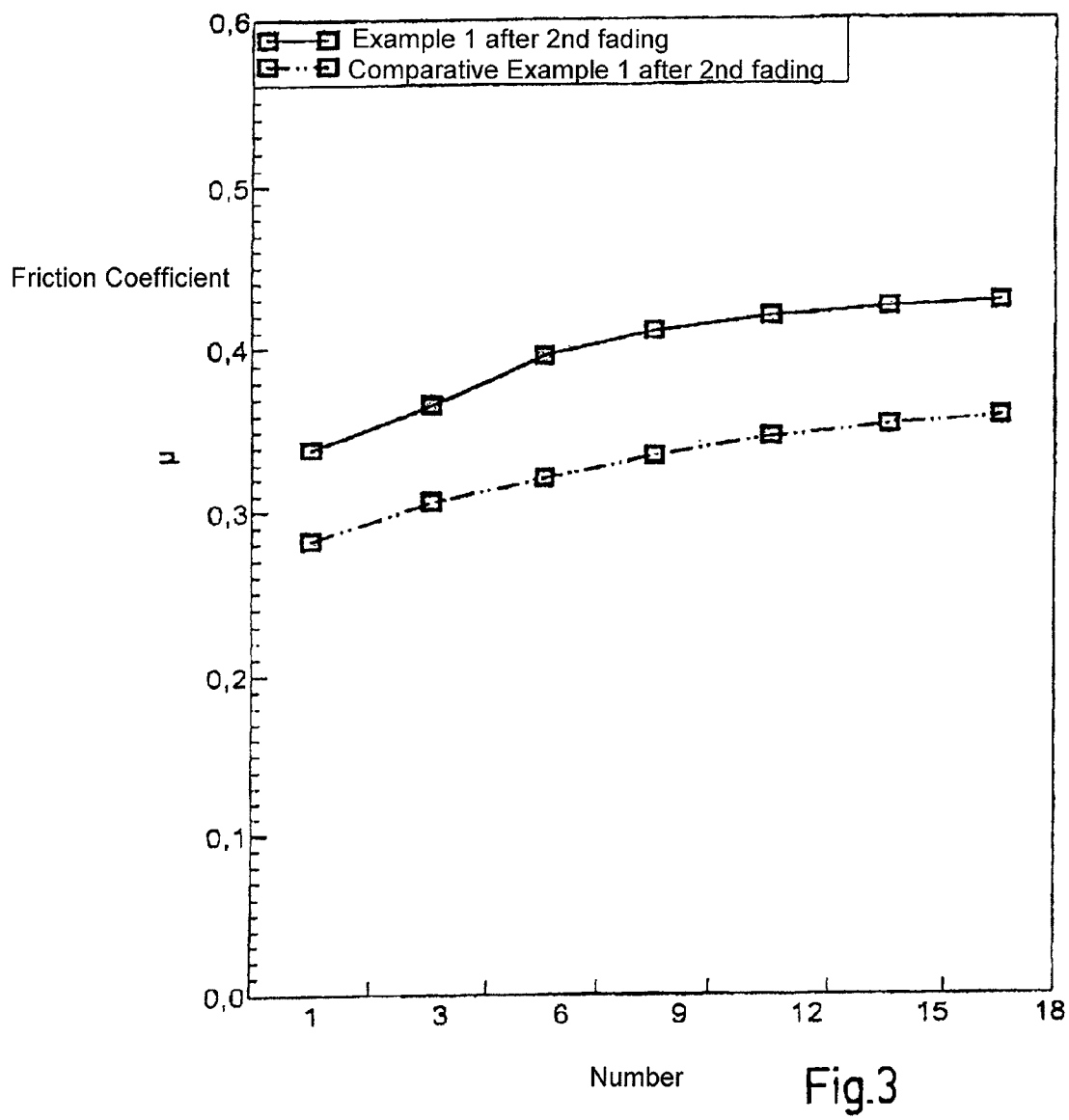
Figure 4:
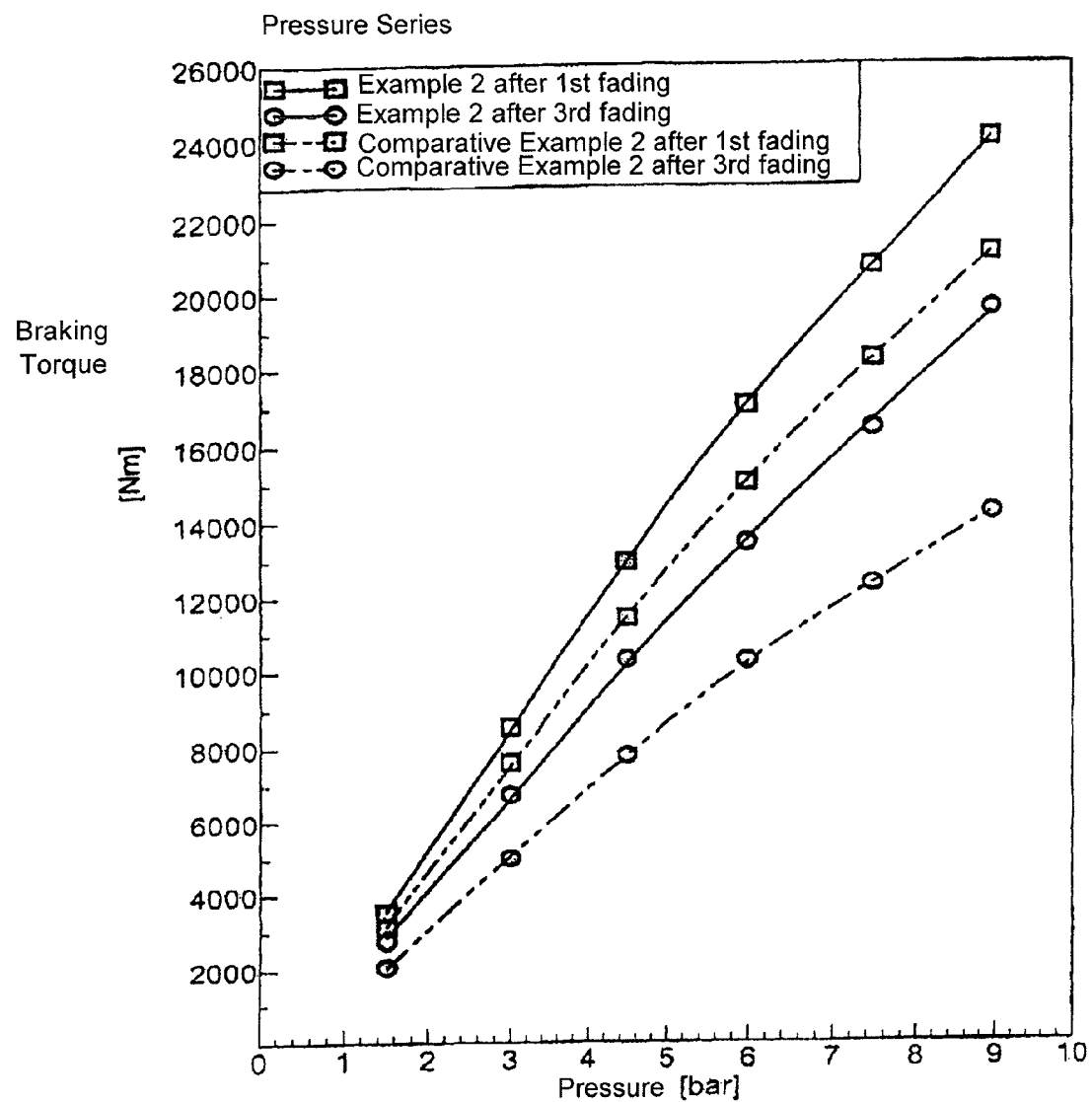
Figure 5:
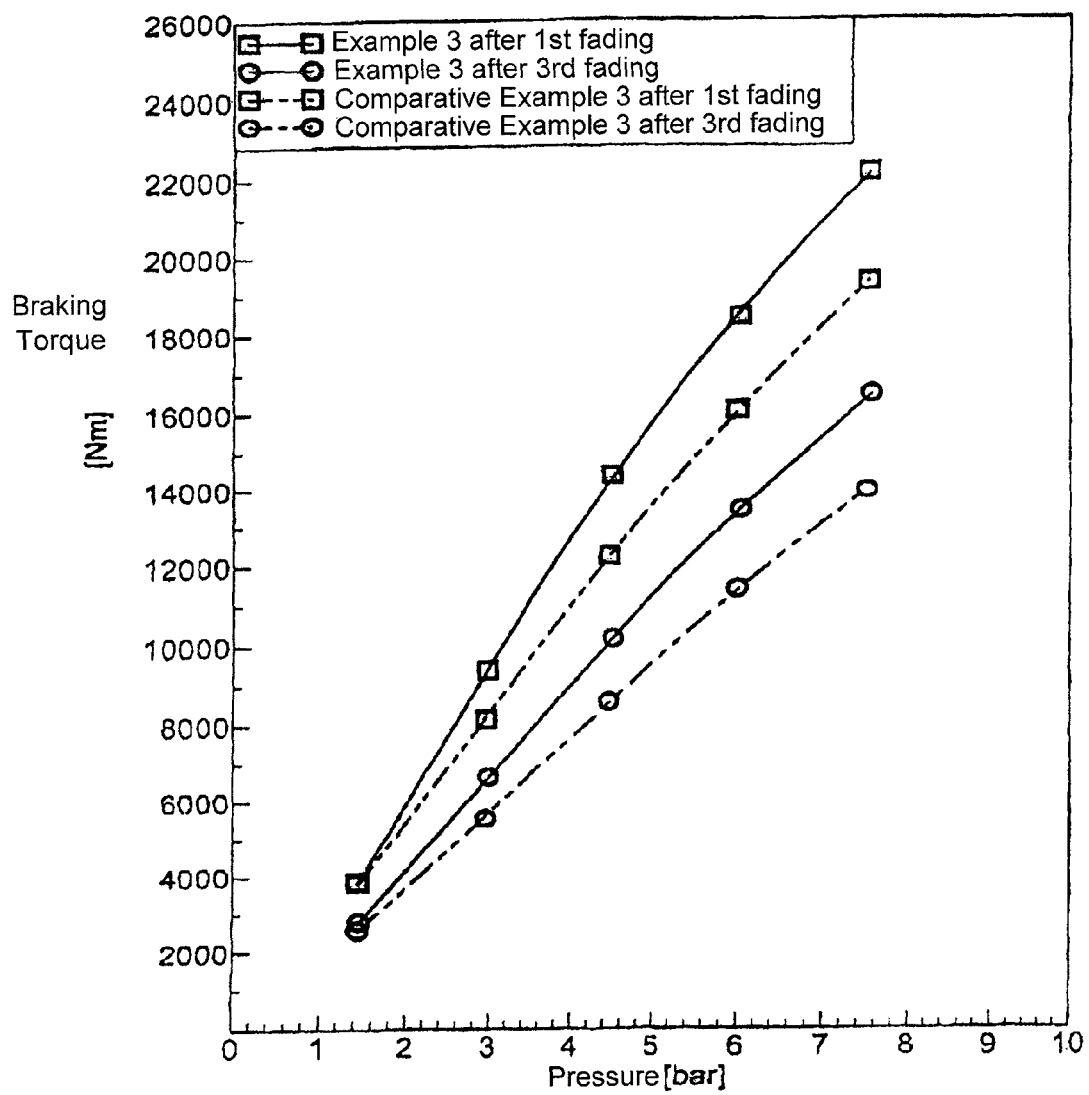
Figure 6:
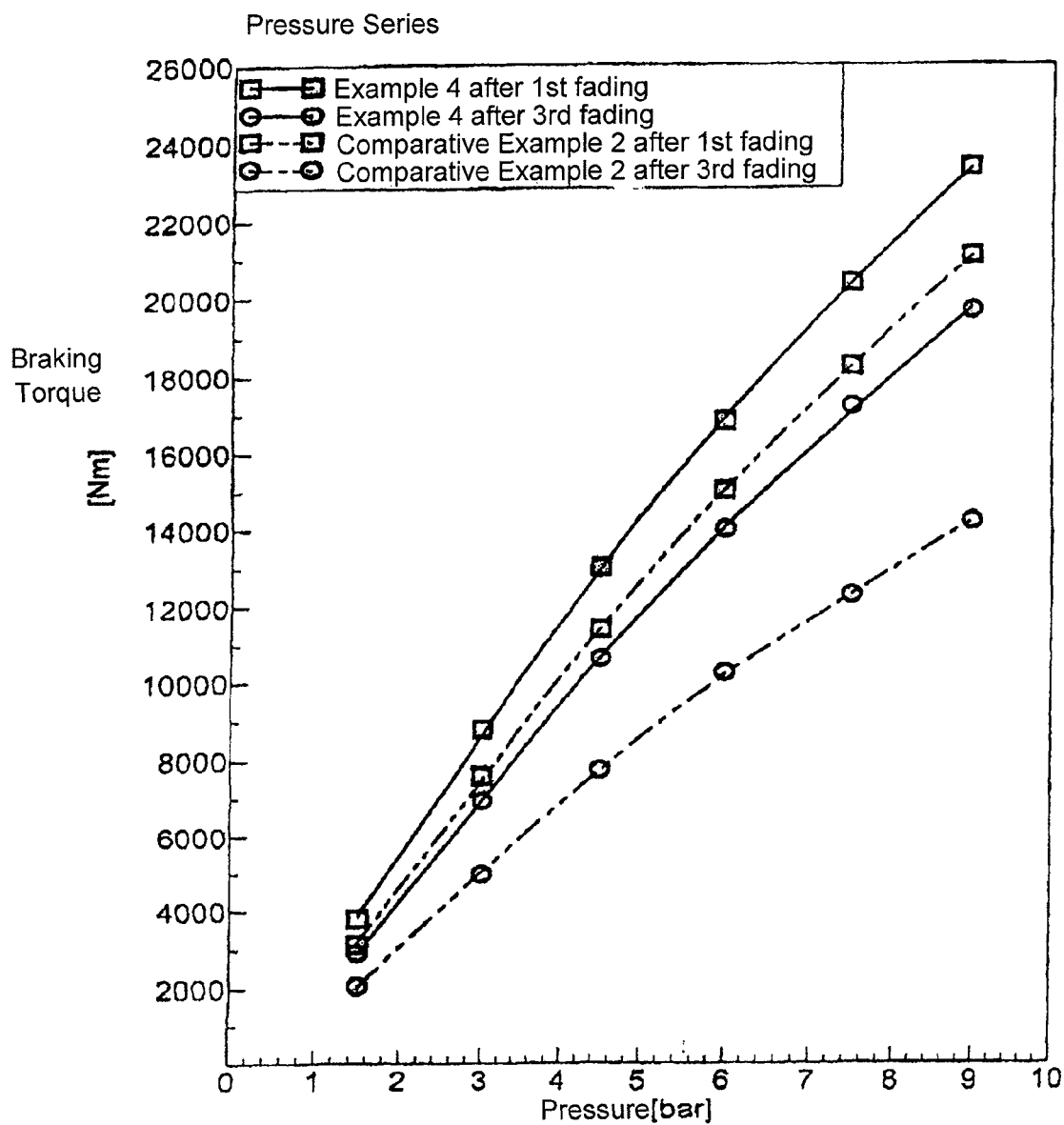
Figure 7:
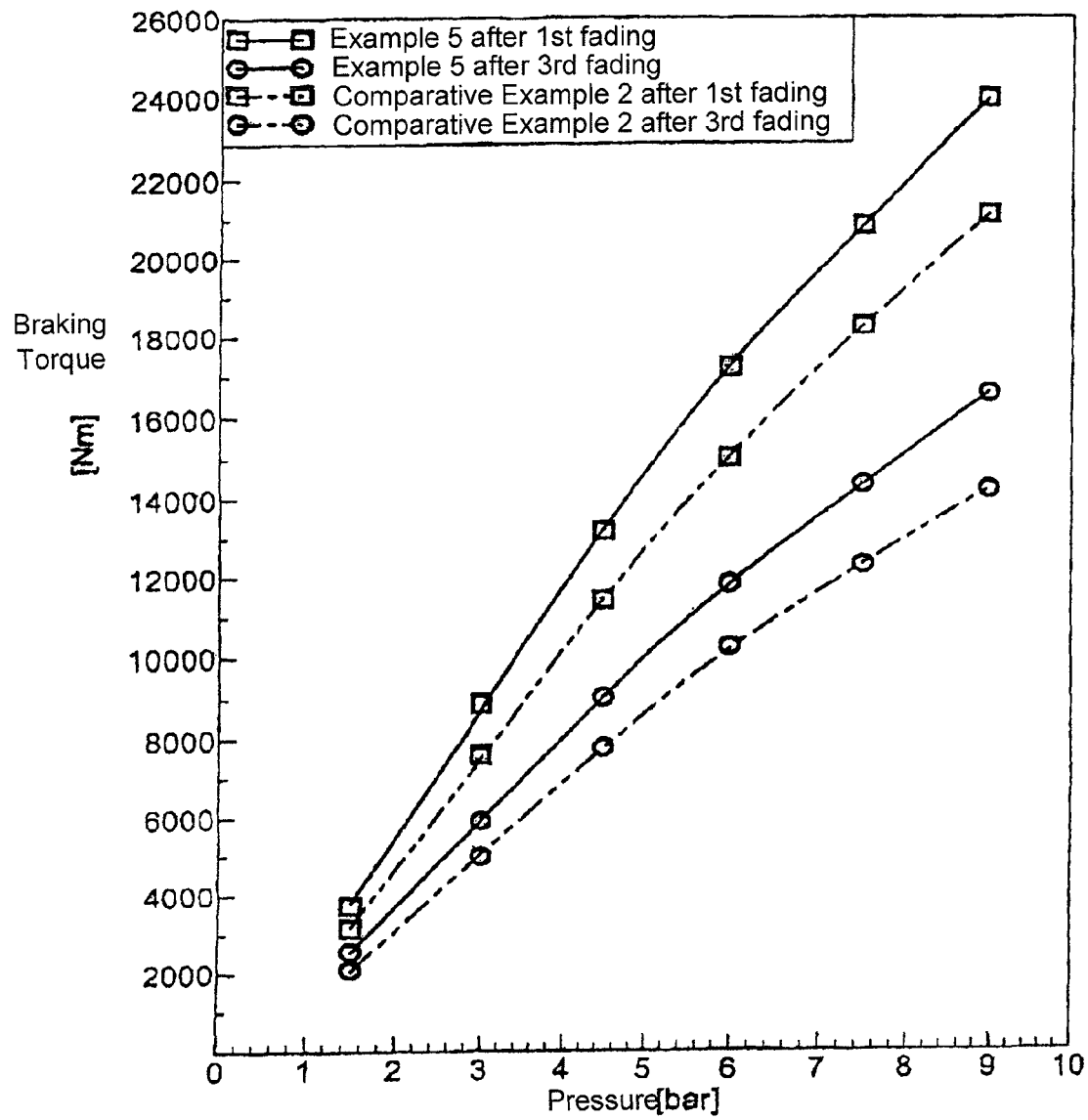

FRICTION LINING MIXTURE FOR A FRICTION MATERIAL, IN PARTICULAR FOR BRAKE AND CLUTCH LININGS

BACKGROUND OF THE INVENTION

The invention relates to a friction lining mixture for a friction material, in particular for brake and clutch linings, the mixture comprising metal fibers and/or powders, functional fillers, lubricants, and organic compounds.

Such friction materials are needed for example for brake and clutch linings, for example for use in motor vehicles, rail vehicles or also in wind power plants. In addition, there is a multiplicity of other applications for such friction materials. Known friction material recipes generally have the following schematic composition:

metallic fibers and/or powder
functional fillers (e.g. glass fibers for reinforcement, metal oxides as friction modifiers, etc.)
solid lubricants
organic compounds (resins, rubber, fibers, etc.)

Besides the technical requirements on friction material development such as typically the improvement of the performance capability, durability and comfort characteristics, the demands concerning environmental protection made on friction material development become more and more important.

From EP 0 654 616 B1 a friction lining mixture for brake and clutch linings is known, which comprises tin sulfides instead of the antimony sulfides customary until then to reduce the susceptibility to cracking of the friction partner. The use of tin sulfides in the friction lining mixture instead of the antimony sulfides customary until then is supposed to reduce the susceptibility to surface cracks of the friction partner occurring at high peak temperature loads.

According to DE-C1 153 670, the use of molybdenum, antimony, lead, zinc, cadmium and tin sulfides in friction lining mixtures is known.

DE-AS 1 150 918 discloses a method for producing a ceramic friction body for brakes and clutches wherein a dry mixture of 20 to 50 parts by weight of natural or synthetic inorganic fibers, 20 to 50 parts by weight of a low-melting glass frit of borates, silicates, phosphates or a mixture thereof, 10 to 40 parts by weight of a metal powder mixture, with the metal consisting of iron or ferrous metals, copper, bronze, brass and/or zinc, and 0 to 15 parts by weight of powdered graphite and/or a powdered sulfide of molybdenum, antimony, lead, tin, zinc or cadmium or powdered boron nitrides is plasticized, pressed into formed pieces with a pressure of about 1000 bar, dried at about 200° C., and then baked in air in a firing range that is between 550 and 650° C.

EP 0 093 673 B1 describes a friction lining mixture based on iron. Besides 72 to 85 percent by weight of powdered iron the friction lining mixture described there comprises 3 to 14 percent by weight of graphite, 2 to 12 percent by weight of coke, 3 to 10 percent by weight of a low-melting material such as for example tin, and up to 3 percent by weight of friction-modifying additives. In the production of the brake lining from this mixture, the iron and tin melt into an alloy with formation of a matrix in which the graphite, the coke and the additive are embedded in a relatively fixed position. The ratio of iron powder to tin should be about 12 to 1.

From EP 1 482 204 B1 a friction lining mixture comprising fibers, binder and filler is known. The fibers are mixtures of bronze fibers and inorganic or organic fibers. The bronze fibers are produced by subjecting them together with tin sulfides and metallic tin powder to a vibration cutting process.

The presence of copper, for example in bronze, in friction lining mixtures is necessary for performance, wear characteristics as well as durability (dust emission) and comfort.

EP 1 681 489 discloses a friction lining mixture comprising a phenolic resin as binder, in which between 1 and 10 percent by volume of iron fibers are embedded. The friction lining mixture further comprises between 1 and 5 percent by volume of aluminum, zinc, tin or mixtures thereof and about 4 percent by volume of antimony sulfide. Tin can be used in powder form or as fiber, the particles of the tin powder having a nominal diameter of about 1.5 mm. The friction lining mixture is free of copper.

US 2009/0064896 A1 discloses a friction lining mixture in which in situ formation of tin sulfide is supposed to take place. For this, the friction lining mixture comprises a sulfur source, typically iron(II) disulfide, a tin source, typically colloidal tin(IV) oxide. The iron disulfide particles can be coated with the tin oxide. The mixture can further comprise a reducing agent such as graphite. The reducing agent reduces tin oxide to metallic tin, which in turn can be reacted with the sulfur source to tin sulfide. Tin sulfide is formed during the braking process at temperatures of 600 to 900° C.

SUMMARY OF THE INVENTION

It is therefore the object of the invention to provide a friction lining mixture suitable for a friction material for brake and clutch linings, which comprises a very low content of copper and with the help of which a significant improvement of the performance capability of the friction pairing due to higher and more stable braking and friction torques is achieved, ultimately resulting in shorter braking distances.

DETAILED DESCRIPTION OF THE PREFERRED EMBODIMENTS

Accordingly, the invention comprises a friction lining mixture of the type described in the beginning, which is characterized in that said friction lining mixture comprises for improving the performance capability of the friction pairing metallic tin in an amount of 0.5 to 50 percent by weight, preferably 2.0 to 10 percent by weight, the copper content in the friction lining mixture being 0.001 to 4.999 percent by weight, preferably 0.001 to 0.499 percent by weight.

Alternatively, a friction lining mixture can be provided, which comprises one or more tin alloys, the tin being present in an amount of 0.5 to 50 percent by weight, preferably 2.0 to 10 percent by weight, based on the friction lining mixture, with the copper content in the friction lining mixture being 0.001 to 4.999 percent by weight, preferably 0.001 to 0.499 percent by weight.

A further alternative according to the invention is a friction lining mixture for improving the performance capability of the friction pairing comprising one or more tin compounds, which release metallic tin prior to or during the friction process. According to this alternative, metallic tin is released for example during the friction process e.g. due to the effect of the friction energy, or prior to the friction process during the production of the brake or clutch lining.

In a further alternative according to the invention, the friction lining mixture comprises a mixture of two or three of the following components: metallic tin, at least one tin alloy or at least one tin compound, which releases metallic tin prior to or during the friction process.

The four alternatives according to the invention are characterized in that they comprise metallic tin or, prior to or during the friction process, can produce metallic tin. For this, the friction lining mixtures according to the invention comprise metallic tin as such or as tin alloy or as tin compound able to release metallic tin. Each of the friction lining mixtures according to the invention further comprises 0.001 to 4.999 percent by weight, preferably 0.001 to 0.499 percent by weight of copper.

Below, the tin present as metallic tin is referred to as metallic tin if this is necessary to distinguish it from tin alloys or tin compounds. The tin comprised in a tin alloy is referred to as alloyed tin. The tin present in a tin compound, which can release metallic tin prior to or during the friction process, is referred to as bound tin. The term tin without the attribute metallic, alloyed or bound designates the stoichiometric tin content in the friction lining mixture, and that independent of the tin being metallic tin, alloyed tin or bound tin.

Surprisingly, it was found that friction materials with 0.001 to 4.999 percent by weight of copper and 0.5 percent by weight to 50.0 percent by weight of tin have better performance, friction coefficient level and friction coefficient stability. The use of tin instead of copper surprisingly results in significant improvement of the performance capability of the friction pairing due to higher and more stable braking and friction torques and hence a shortening of the braking distance.

According to a further embodiment of the invention, the friction lining mixture comprises a content of 0 to 70 percent by weight of metals, 3 to 50 percent by weight of functional fillers, 10 to 45 percent by weight of lubricants and 3 to 25 percent by weight of organic additives, the metal content comprising metallic, alloyed or bound tin in an amount of 0.5 to 50 percent by weight, preferably between 2.0 and 10 percent by weight, and copper in an amount of 0.001 to 4.999 percent by weight, preferably 0.001 to 0.499 percent by weight. An advantageous embodiment of the invention provides for the tin to be metallic and/or alloyed and/or bound tin, each included in an amount of 0.5 to 50.0 percent by weight, preferably between 2.0 and 10.0 percent by weight.

The iron content in the friction lining mixtures according to the invention is preferably 10 to 20 percent by volume of iron. Preferably, the iron is present in the form of steel wool.

The term "organic additives" also comprises aramid and/or cellulose fibers in the present invention.

The friction lining mixture according to the invention is used for producing a friction lining, in particular for producing brake and clutch linings. The friction lining cooperates with a friction partner. The friction partner is for example a disk or a ring-shaped disk against which the friction lining is pressed during the braking process. The friction partner consists for example of gray cast iron, a metal such as aluminum or stainless steel, ceramic and/or a carbon fiber-reinforced material.

The friction lining mixtures according to the invention can be produced by methods utilized in prior the art for producing friction lining mixtures, only the composition of the components having to be varied in accordance with the invention. The thorough mixing of the components can occur by means of a commercial mixer, so that the ingredients are homogeneously distributed. A certain order does not need to be adhered to when adding the components. All components can also be added simultaneously to the mixer.

Further advantageous embodiments of the invention are subject matter of the subordinate claims.

A. Friction Lining Mixture Comprising Metallic or Alloyed Tin

The metallic tin or the alloyed tin can be present in any modification, for example as alpha, beta, gamma tin, beta tin being preferred even though the other two tin modifications also have advantages, so that those skilled in the art can determine the tin modification depending on the precise application purpose of the friction lining mixture. Alpha tin has high stability, whereas gamma tin besides its high stability can be easily processed into a powder because of its brittleness.

If the tin is present in a tin alloy, the tin alloy should contain neither cadmium nor lead since these substances are not permitted. The term tin alloys comprises all alloys that can be formed with tin, in particular binary and ternary alloys. Examples for alloys are bronze (a tin/copper alloy), babbitt metals (with 5 to 80 percent by weight of tin and a content of copper and optionally antimony), Britannia metal (with 70 to 94 percent by weight of tin, 5 to 16 percent by weight of antimony and 0.2 to 5 percent by weight of copper) and pressure die casting materials (with 49 to 79 percent by weight of tin, 12 to 18 percent by weight of antimony, 3.5 to 4.5 percent by weight of copper).

An example of a bronze is a bronze comprising 40 percent by weight of tin and 60 percent by weight of copper. Examples of babbitt metals are for example a babbitt metal comprising 90 percent by weight of tin and 10 percent by weight of copper, and a babbitt metal comprising 89 percent by weight of tin, 7 percent by weight of antimony and 4 percent by weight of copper.

If the friction lining mixture comprises metallic tin or alloyed tin, the metallic tin or the tin alloy is present as powder, granules, fibers, spherical, irregular and/or dendritic particles. Particularly preferably, the metallic tin or the tin alloy is present in the form of small particles or in small grain size.

Thus, a first embodiment provides for a friction lining mixture wherein the metallic tin or the tin alloy is included with a grain size distribution of 0.2 μm to 600 μm with a specific surface of 1.0 $m^2$/g to 1.5 $m^2$/g.

According to a second embodiment, the grains of the metallic tin or the tin alloy in the friction lining mixture have a size of 63 μm to 125 μm.

A third embodiment provides for a friction lining mixture wherein the metallic tin or the tin alloy is included with a grain size distribution of 0.3 μm to 200 μm with a specific surface of 1.0 $m^2$/g to 1.5 $m^2$/g.

A fourth embodiment provides for a friction lining mixture wherein the metallic tin or the tin alloy is included with a grain size distribution of 0.2 μm to 200 μm with a specific surface of 1.0 $m^2$/g to 1.5 $m^2$/g.

A fifth embodiment provides for a friction lining mixture wherein the metallic tin or the tin alloy is included with a grain size distribution of 0.5 μm to 250 μm with a specific surface of 1.0 $m^2$/g to 1.5 $m^2$/g.

Particularly preferably, the metallic tin or the tin alloy in powder form has the following grain size distribution:
  91 to 95 percent by weight of particles of less than 45 μm
  5 to 10 percent by weight of particles of 45 μm to 64 μm
  0 to 3 percent by weight of particles greater than 64 μm.

In a further embodiment the tin is present as coating or shell of cores. Such cores are for example metal cores, in particular iron cores. Advantageously, the cores with a tin shell or coated with tin form spherical formed pieces, for example granulate. The tin shell or tin coating can be made of metallic tin or a tin alloy.

With regard to the grain size distribution and specific surface, the metal cores with tin shell can have the properties described in one of the first to sixth embodiment.

The particularly fine-grained nature of the metallic tin or tin alloy included in the friction lining mixture allows for the tin to be uniformly distributed in the produced friction lining.

Finally, the tin can also be introduced into the friction metal mixtures via recycled material comprising metallic tin or tin alloys. Suitable recycled materials are for example tinplate, tinfoil, tinsel and mixtures of such recycled materials. For this, advantageously the recycled material should be provided as powder, granules, fibers or particles, which preferably have the properties mentioned above, for example with regard to grain size distribution.

B. Friction Lining Mixture Comprising Tin Compounds

The friction lining mixture can comprise one or more tin compounds, which release metallic tin prior to or during the friction process. According to this alternative, metallic tin is released for example during the friction process, e.g. due to the effect of the friction energy, or prior to the friction process during the production of the brake or clutch lining.

The release of metallic tin can be achieved by chemical, physical or mechanical action on the tin compound in the friction material during the production of a brake or clutch lining, or in the produced brake or clutch lining during a braking process. For example, the heat produced during the braking process can cause the reduction of the bound tin in the tin compound.

Advantageously, the friction lining mixture including tin compounds comprises besides the tin compound(s) suitable reducing agents and optionally suitable catalysts. For example, carbon included in the friction lining mixture can serve as reducing agent. Examples for suitable reducing agents comprise coke, graphite, iron (e.g. in the form of steel wool and/or iron powder), zinc (e.g. zinc powder) or aluminum (e.g. aluminum powder or aluminum fibers) and mixtures of these reducing agents.

Preferred tin compounds are tin(II) oxide, tin(IV) oxide (tin dioxide), tin(II) sulfate ($SnSO_4$), or tin sulfides such as tin(II) sulfide (SnS) or tin(IV) sulfide ($SnS_2$). Furthermore, tin compounds should also be used in which the tin is released by means of added catalysts and/or other reaction components in the friction material block, e.g. also by means of heat produced during the braking process.

Preferred tin compounds are also organic tin compounds, which through thermal, chemical, catalytic or mechanical initiation, during the production or during application in the friction material, release metallic tin, alone or in combination with other substances. Such organic tin compounds comprise in particular tin(IV) organic compounds of the general formula

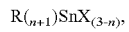

wherein R is selected from the group comprising alkyl and/or aryl groups; X is hydrogen, a hydroxy, halogen or acyloxy group; and n is 0 or an integer greater than or equal to 1. Preferred compounds are mono- or dialkyltin compounds. Tin(II) organic compounds are also suitable. The C—Sn bond in organic tin compounds is highly polar and therefore easily cleavable.

Particularly suitable organic tin compounds are in particular those that do not contain Sn—C bonds. Tin salts of organic acids, for example tin octoate and tin stearate, are particularly suitable.

The use of tin compounds, preferably of organotin compounds, has the advantage that metallic tin is formed in situ. This metallic tin formed in situ is particularly finely dispersed in the produced friction lining.

Below, the invention is explained in more detail by means of examples with reference to the drawing. Neither the examples nor the drawing are supposed to limit the invention in any form. In the figures FIG. 1 shows a schematic cross-sectional view of a spherical formed piece, the core of which is coated with a shell of tin;

FIG. 2 to FIG. 7 show diagrams depicting the friction coefficients of friction lining mixtures according to the invention and comparative mixtures.

In FIG. 1, an example of a spherical formed piece as example of an embodiment according to the invention is shown. Such formed pieces can be utilized to introduce metallic tin or alloyed tin via a tin alloy into the friction lining mixture. The shown spherical formed piece has a core 1 made of iron and a shell 2 made of tin.

Friction lining mixtures were produced with the friction lining compositions shown in Tables 1 to 5. The numerical data is given in percent by weight, based on the weight of the produced friction lining mixture.

EXAMPLES

The detailed examples only serve to illustrate the invention and are not to be construed as limiting in any way the scope of the invention, the application and utility thereof.

Example 1 (Tin) and Comparative Example 1 (Copper)

TABLE 1

| Raw material | Example 1 Content in wt % | Comparative Example 1 Content in wt % |
| --- | --- | --- |
| Binding resin | 7.0 | 7.0 |
| Rubber | 1.1 | 1.1 |
| Steel wool | 24.5 | 24.5 |
| Iron powder | 5.0 | 5.0 |
| Zinc powder | 2.0 | 2.0 |
| Cellulose fiber | 1.4 | 1.4 |
| Tin | 4.0 | — |
| Copper | — | 4.0 |
| Coke | 12.8 | 12.8 |
| Metal sulfides [Sn, Mn, Fe] | 14.5 | 14.5 |
| Fluorspar | 2.0 | 2.0 |
| Metal oxides [Sn, Mn, Fe] | 14.5 | 14.5 |
| Heavy spar | 9.0 | 9.0 |
| Friction particles | 2.0 | 2.0 |
| Silicon carbide | 0.2 | 0.2 |

Several of the used raw materials comprise traces of copper. Steel wool for example typically comprises 0.045% of copper. Correspondingly, the example comprises 0.011% of copper.

Example 1/Comparative Example 1 forms the basis of comparative tests for the application disk brake in an automobile.

Example 2 (Tin) and Comparative Example 2 (Copper)

TABLE 2

| Raw material | Example 2 Content in wt % | Comparative Example 2 Content in wt % |
| --- | --- | --- |
| Binding resin | 5.3 | 5.3 |
| Rubber | 2.0 | 2.0 |
| Steel wool | 35.6 | 35.6 |
| Glass fiber | 2.7 | 2.7 |

TABLE 2-continued

| Raw material | Example 2 Content in wt % | Comparative Example 2 Content in wt % |
|---|---|---|
| Cellulose fiber | 2.5 | 2.5 |
| Tin | 5.8 | — |
| Copper | — | 5.8 |
| Metal silicate [Ca, Mg, Al, Fe] | 4.0 | 4.0 |
| Coke | 10.0 | 10.0 |
| Graphite | 7.3 | 7.3 |
| Metal sulfide [Sb, Sn, Zn] | 7.5 | 7.5 |
| Fluorspar | 0.9 | 0.9 |
| Metal oxides [Al, Cr, Fe, Mg] | 16.3 | 16.3 |
| Silicon carbide | 0.1 | 0.1 |

Several of the used raw materials comprise traces of copper. Steel wool for example typically comprises 0.045% of copper. Correspondingly, the example comprises 0.016% of copper.

Example 2/Comparative Example 2 form the basis of comparative tests for the application disk brake in a motor truck.

Example 3 (Tin) and Comparative Example 3 (Copper)

TABLE 3

| Raw material | Example 3 Content in wt % | Comparative Example 3 Content in wt % |
|---|---|---|
| Binding resin | 7.5 | 7.5 |
| Rubber | 1.3 | 1.3 |
| Steel wool | 35.4 | 35.4 |
| Mineral fiber | 0.9 | 0.9 |
| Cellulose fiber | 1.1 | 1.1 |
| Tin | 8.0 | — |
| Copper | — | 8.0 |
| Brass | 1.0 | 1.0 |
| Metal silicate [Mg, Al, Fe, K, Ca] | 4.1 | 4.1 |
| Coke | 9.7 | 9.7 |
| Graphite | 6.8 | 6.8 |
| Metal sulfide [Sb, Sn, Zn, Mo] | 7.6 | 7.6 |
| Fluorspar | 0.2 | 0.2 |
| Metal oxides [Al, Cr, Fe, Mg] | 16.0 | 16.0 |
| Silicon carbide | 0.4 | 0.4 |

Several of the used raw materials comprise traces of copper. Brass typically comprises 60% of copper. Correspondingly, the example comprises 0.6% of copper.

Example 3/Comparative Example 3 forms the basis of comparative tests for the application disk brake in a motor truck.

Example 4 (Tin Oxide)/Comparative Example 2 (Copper)

TABLE 4

| Raw material | Example 4 Content in wt % | Comparative Example 2 Content in wt % |
|---|---|---|
| Binding resin | 5.3 | 5.3 |
| Rubber | 2.0 | 2.0 |
| Steel wool | 34.0 | 35.6 |
| Glass fiber | 2.7 | 2.7 |

TABLE 4-continued

| Raw material | Example 4 Content in wt % | Comparative Example 2 Content in wt % |
|---|---|---|
| Cellulose fiber | 2.5 | 2.5 |
| Copper | — | 5.8 |
| Tin (IV) oxide | 7.4 | — |
| Metal silicate [Ca, Mg, Al, Fe] | 4.0 | 4.0 |
| Coke | 10.0 | 10.0 |
| Graphite | 7.3 | 7.3 |
| Metal sulfide [Sb, Sn, Zn] | 7.5 | 7.5 |
| Fluorspar | 0.9 | 0.9 |
| Metal oxides [Al, Cr, Fe, Mg] | 16.3 | 16.3 |
| Silicon carbide | 0.1 | 0.1 |

Several of the used raw materials comprise traces of copper. Steel wool for example typically comprises 0.045% of copper. Correspondingly, the example comprises 0.015% of copper.

Example 4/Comparative Example 2 forms the basis of comparative tests for the application disk brake in a motor truck.

Example 5 (Tin Oxide)/Comparative Example 2 (Copper)

TABLE 5

| Raw material | Example 5 Content in wt % | Comparative Example 2 Content in wt % |
|---|---|---|
| Binding resin | 5.3 | 5.3 |
| Rubber | 2.0 | 2.0 |
| Steel wool | 34.0 | 35.6 |
| Glass fiber | 2.7 | 2.7 |
| Cellulose fiber | 2.5 | 2.5 |
| Copper | — | 5.8 |
| Zinc powder | 6.4 | — |
| Tin (IV) oxide | 7.4 | — |
| Metal silicate [Ca, Mg, Al, Fe] | 4.0 | 4.0 |
| Coke | 6.3 | 10.0 |
| Graphite | 4.6 | 7.3 |
| Metal sulfide [Sb, Sn, Zn] | 7.5 | 7.5 |
| Fluorspar | 0.9 | 0.9 |
| Metal oxides [Al, Cr, Fe, Mg] | 16.3 | 16.3 |
| Silicon carbide | 0.1 | 0.1 |

Several of the used raw materials comprise traces of copper. Steel wool for example typically comprises 0.045% of copper. Correspondingly, the example comprises 0.015% of copper.

Example 5/Comparative Example 2 forms the basis of comparative tests for the application disk brake in a motor truck.

Test Results
Diagrams 1 and 2:
Test bench result: Example 1/Comparative Example 1,
Summary of performance test in accordance with SAE J2522
(AK master)—FIG. 2 and FIG. 3

In Diagrams 1 and 2, friction coefficients after the first and second fading versus the number of recovery brake applications are shown. In all cases, Example 1 provides higher friction coefficients than Comparative Example 1. The recovery behavior after the first fading and after the second fading is almost identical for Example 1. In contrast, after the second fading Comparative Example 1 only achieves lower friction coefficients than after the first fading. Consequently, Example 1 provides higher and more stable friction coefficients and hence shorter braking distances than Comparative Example 1.

Diagram 3:
   Test bench result: Example 2/Comparative Example 2,
   Summary of performance test in accordance with ISO 26865—FIG. 4

Braking torques versus pressure, so called pressure series, are shown. Here, in particular the pressure series after the first and third fading. Example 2 provides higher braking torques than Comparative Example 2 at all pressures. The drop of the braking torque from after the first fading to after the third fading is significantly lower in Example 2 than in Comparative Example 2. Consequently, Example 2 provides higher and more stable braking torques and hence shorter braking distances than Comparative Example 2.

Diagram 4:
   Test bench result: Example 3/Comparative Example 3,
   Summary of performance test in accordance with ISO 26865—FIG. 5

Braking torques versus pressure, so called pressure series, are shown. Here, in particular the pressure series after the first and third fading. Example 3 provides higher braking torques than Comparative Example 3 at all pressures. Consequently, Example 3 provides higher braking torques and hence shorter braking distances than Comparative Example 3.

Diagram 5:
   Test bench result: Example 4/Comparative Example 2,
   Summary of performance test in accordance with ISO 26865—FIG. 6

Braking torques versus pressure, so called pressure series, are shown. Here, in particular the pressure series after the first and third fading. Example 4 provides higher braking torques than Comparative Example 2 at all pressures. The drop of the braking torque from after the first fading to after the third fading is significantly lower in Example 4 than in Comparative Example 2. Consequently, Example 4 provides higher and more stable braking torques and hence shorter braking distances than Comparative Example 2.

Diagram 6:
   Test bench result: Example 5/Comparative Example 2,
   Summary of performance test in accordance with ISO 26865—FIG. 7

Braking torques versus pressure, so called pressure series, are shown. Here, in particular the pressure series after the first and third fading. Example 5 provides higher braking torques than Comparative Example 2 at all pressures. Consequently, Example 5 provides higher braking torques and hence shorter braking distances than Comparative Example 2.

The invention claimed is:

1. An organically bound friction lining mixture for brake and clutch linings cooperating with a friction partner, the friction lining mixture comprising metal fibers and/or powders, functional fillers, lubricants and organic compounds, wherein for improving the performance capability of the friction pairing said friction lining mixture contains metallic tin or a tin alloy in an amount of 0.5 to 50.0 percent by weight and copper in an amount of 0.001 to 4.999 percent by weight, wherein the metallic tin or the tin alloy is included in the friction lining mixture as powder with a grain size distribution of 0.2 µm to 600 µm and with a specific surface of 1.0 m²/g to 1.5 m²/g.

2. A friction lining mixture according to claim 1, characterized in that the metallic tin or the tin alloy has a grain size distribution of 0.5 µm to 250 µm.

3. A friction lining mixture according to claim 1, characterized in that the metallic tin or the tin alloy has a grain size distribution of 0.2 µm to 200 µm.

4. A friction lining mixture according to claim 1, characterized in that the metallic tin or the tin alloy has a grain size distribution of 0.3 µm to 200 µm.

5. A friction lining mixture according to claim 1, characterized in that the metallic tin or tin alloy has a grain size distribution of 63 µm to 125 µm.

6. A friction lining mixture according to claim 1, characterized in that the metallic tin or tin alloy in powder form has the following grain size distribution:
   91 to 95 percent by weight of particles of less than 45 µm;
   5 to 10 percent by weight of particles of 45 µm to 64 µm; and
   0 to 3 percent by weight of particles greater than 64 µm.

7. A friction lining mixture according to claim 1, characterized in that it has the following composition in percent by weight, based on the friction lining mixture:

| | |
|---|---|
| binding resin | 7.0 |
| Rubber | 1.1 |
| steel wool | 24.5 |
| iron powder | 5.0 |
| zinc powder | 2.0 |
| cellulose fiber | 1.4 |
| Tin | 4.0 |
| Coke | 12.8 |
| metal sulfides | 14.5 |
| Fluorspar | 2.0 |
| metal oxides | 14.5 |
| heavy spar | 9.0 |
| friction particles | 2.0 |
| silicon carbide | 0.2. |

8. A friction lining mixture according to claim 1, characterized in that it has the following composition in percent by weight, based on the friction lining mixture:

| | |
|---|---|
| binding resin | 5.3 |
| Rubber | 2.0 |
| steel wool | 35.6 |
| glass fiber | 2.7 |
| cellulose fiber | 2.5 |
| Tin | 5.8 |
| metal silicate | 4.0 |
| Coke | 10.0 |
| Graphite | 7.3 |
| metal sulfide | 7.5 |
| Fluorspar | 0.9 |
| metal oxides | 16.3 |
| silicon carbide | 0.1. |

9. A friction lining mixture according to claim 1, characterized in that the metallic tin or the tin alloy originates from recycled tin material.

10. A friction lining mixture according to claim 1, characterized in that said friction lining mixture comprises up to 70 percent by weight of metals, 3 to 50 percent by weight of functional fillers, 10 to 45 percent by weight of lubricants and 3 to 25 percent by weight of organic additives.

11. An organically bound friction lining mixture for brake and clutch linings cooperating with a friction partner, the friction lining mixture comprising metal fibers and/or powders, functional fillers, lubricants and organic compounds, wherein for improving the performance capability of the friction pairing said friction lining mixture contains one or more tin compounds and contains copper in an amount of 0.001 to 4.999 percent by weight, wherein the one or more tin compounds comprises metallic tin or tin alloy included in the friction lining mixture as powder with a specific surface of 1.0 $m^2/g$ to 1.5 $m^2/g$.

12. A friction lining mixture according to claim 11, characterized in that said friction lining mixture comprises up to 70 percent by weight of metals, 3 to 50 percent by weight of functional fillers, 10 to 45 percent by weight of lubricants and 3 to 25 percent by weight of organic additives, the metal content comprising the metallic tin or tin alloy in an amount of 0.5 to 50 percent by weight of the friction lining mixture.

13. The friction lining mixture according to claim 12, wherein the tin is in an amount between 2.0 and 10 percent by weight of the friction lining mixture.

14. An organically bound friction lining mixture for brake and clutch linings cooperating with a friction partner, the friction lining mixture comprising metal fibers and/or powders, functional fillers, lubricants and organic compounds, wherein for improving the performance capability of the friction pairing said friction lining mixture contains metallic tin or a tin alloy in an amount of 0.5 to 50.0 percent by weight and copper in an amount of 0.001 to 4.999 percent by weight, characterized in that said friction lining mixture comprises spherical formed pieces having a core (1) and a shell (2), the shell consisting of said metallic tin or tin alloy.

* * * * *